US005373932A

United States Patent [19]

Stöbich et al.

[11] Patent Number: 5,373,932

[45] Date of Patent: Dec. 20, 1994

[54] FIRE BARRIER

[75] Inventors: Jochen Stöbich, Langelsheim; Joachim Luther, Visnenburg, both of Germany

[73] Assignee: Stoebich Brandschutz GmbH, Goslar, Germany

[21] Appl. No.: 63,851

[22] Filed: May 18, 1993

[51] Int. Cl.[5] .............. B65G 43/00

[52] U.S. Cl. .............. 198/502.1; 198/950; 49/2; 49/5; 49/7; 49/235; 169/48; 169/64

[58] Field of Search .............. 198/502.1, 810, 950; 52/232; 49/1, 2, 4, 5, 7, 8, 235; 169/48, 64

[56] References Cited

U.S. PATENT DOCUMENTS

| | | | |
|---|---|---|---|
| 3,039,573 | 6/1962 | Gerhardt | 49/1 |
| 4,619,075 | 10/1986 | Wiles | 49/235 |
| 5,269,378 | 12/1993 | Maas et al. | 169/48 |

FOREIGN PATENT DOCUMENTS

| | | | |
|---|---|---|---|
| 0124910B1 | 8/1884 | European Pat. Off. | |
| 124910 | 11/1984 | European Pat. Off. | 169/48 |
| 0163987B1 | 10/1987 | European Pat. Off. | |
| 224366 | 7/1985 | Germany | 169/48 |
| 3417761 | 11/1985 | Germany | 169/48 |
| 2848069C2 | 8/1988 | Germany | |

*Primary Examiner*—Joseph E. Valenza
*Attorney, Agent, or Firm*—McAulay Fisher Nissen Goldberg & Kiel

[57] ABSTRACT

A fire barrier apparatus includes a wall separating two adjacent spaces, extending in a predetermined plane and formed from a fire resistant material. The wall has an opening. The apparatus further includes a conveyor defining a conveyor path which extends through the opening. The conveyor has at least one conveyor element within the predetermined plane. A shutter is included within the range of the opening. The shutter is composed of fire resistant material and is movable towards the conveyor element and away from it between an open position where the opening is free and a closed position where the opening is shut off. At least part of the shutter is included in an encasing arrangement for encasing the conveyor element in the closed position of the shutter. Several embodiments are described.

2 Claims, 8 Drawing Sheets

FIRE BARRIER

FIELD OF THE INVENTION

The present invention relates to fire barriers arranged in a conveyor path, and more specifically to fire barriers formed by a wall with an opening through which a conveyor continually extends, and a shutter for closing this opening in case of fire.

BACKGROUND OF THE INVENTION

When two spaces, e.g. two rooms of a building or the interior and the exterior of a building, shall be separated by a fire barrier wall, and a conveyor path extends through both spaces, it is usual to arrange a first conveyor leading up to an opening in said wall in one of the spaces and to have a second conveyor on the other side of such opening so that any article transported by the first conveyor can be transferred through the opening to the second conveyor. In this way, it is easy to arrange the plane of the shutter between both conveyors.

However, this approach has the disadvantage that many conveyor parts, particularly the driving arrangement, have to be doubled, because each of the conveyors has to be driven. Thus, although there is the advantage that no conveyor part which could interfere with the shutter when closing the opening in case of a fire, this approach is relatively expensive. Moreover, safe transfer of items is not ensured or has to be ensured by additional measures which will result in a further increase of costs.

German Patent No. 28 48 069 shows an approach for sealing a single continuous belt conveyor running horizontally through an opening in a fire barrier wall. In this case, the design relies on a material which foams under heat so as to seal all gaps. Within the range of the belt, foaming material is provided on the relatively broad front edge surface of the shutter as well as beneath the belt. In this way, a relatively large mass of foaming material has to be used not only to fill small gaps, but also relatively broad slots. Since such foaming material has a relatively poor heat conduction, there is the danger that it will predominantly foam at places where it is in contact with a material of higher heat conduction, while at other places foaming might not be ensured. Moreover, there is the danger that flames come directly in contact with this foaming material which is undesirable.

EP-Patent Nr. 0 124 910 relates to a fire barrier in a lift shaft of the paternoster-type. There are two guide rails extending through an opening of a horizontal wall, and articles are carried between them. However, such a design cannot be used without an appropriate modification for horizontal conveyors or conveyors with a horizontal component of movement where, in addition to a load carring section of an endless towing, such as a chain or a belt, there is also an idle section which has to be sealed.

Therefore, there is a need for improving the existing fire barriers in order to adapt them better to horizontal or substantially horizontal conveyors.

SUMMARY OF THE INVENTION

It is therefore an object of the present invention to provide an improved protection of at least one conveyor element in the plane of the shutter having a fire barrier.

Another object of the present invention is to provide a shutter whose guide of movement can be designed in a simpler way and which is particularly adapted to horizontal conveyors, and especially to conveyors with a certain slope in relation to a horizontal plane.

It is a further object of the present invention to guide the shutter in a pivotal movement. In the case of a conveyor inclined with respect to a horizontal plane, a shorter path of shutter movement will result so that the barrier becomes effective in a shorter time.

It is still a further object of the present invention to provide a better seal by foaming material and to ensure that heat is transferred to the foaming agent to initiate foaming in a more efficient way so as to ensure that all portions of the foaming agent will foam more uniformly.

Yet another object of the present invention is to provide a drive for the shutter by a driving weight which might be relatively heavy to cause the shutter to seal the opening under a certain pressure against the surface of a conveyor part lying in its plane (and which is, in some cases, more or less resilient, such as a conveyor belt) without causing an undue acceleration of the shutter during movement.

BRIEF DESCRIPTION OF THE DRAWINGS

Further objects and advantages of the present invention will become apparent from the following non-limiting description of preferred embodiments with reference to the accompanying drawings.

DESCRIPTION OF THE PREFERRED EMBODIMENTS

Figure 1:
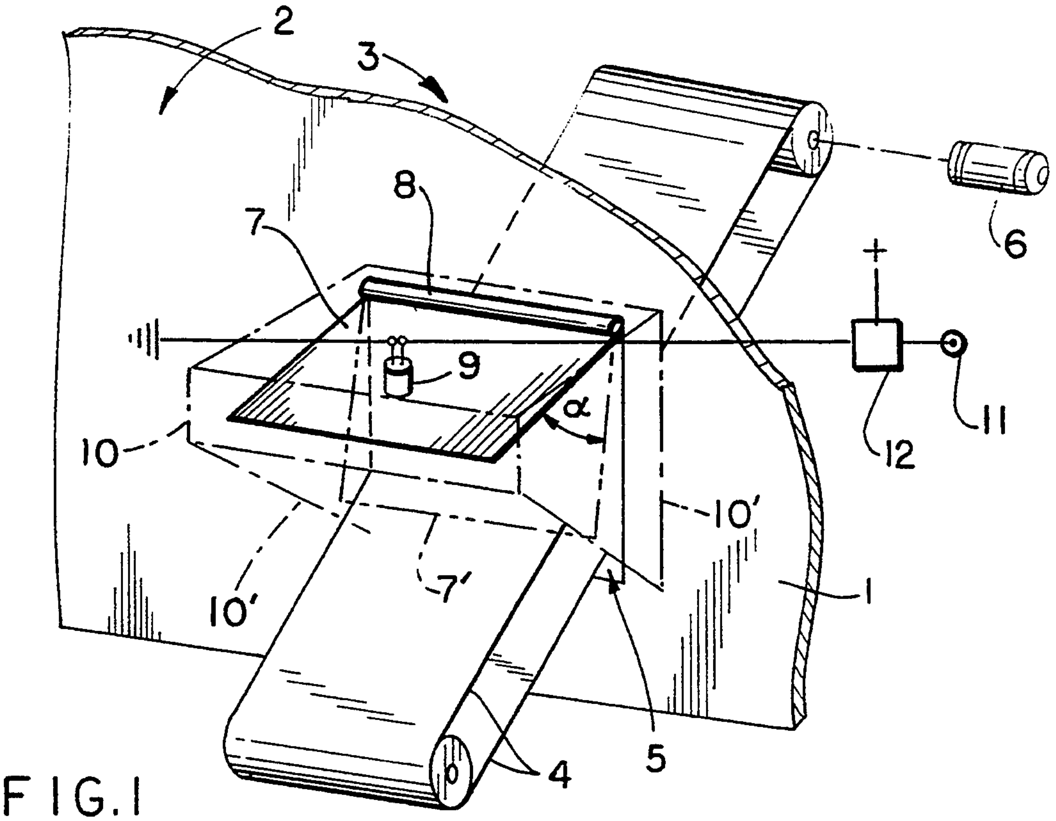
FIG. 1 is an axonometric view of a first embodiment showing an inclined belt conveyor and a pivotal fire shutter.

According to FIG. 1, there is a fire barrier wall 1 separating two rooms or spaces 2 and 3. An inclined belt conveyor 4 extends though an opening 5 within wall 1 so as to transfer articles, e.g. luggage at an airport, from one space 2 or 3 to the other. Conveyor 4 is driven by a single motor 6 arranged in one of the spaces, i.e. in space 3 in this embodiment.

In order to shut both spaces against one another in case of a fire, there is a shutter plate 7 of fire resistant material pivotally mounted on a hinge member 8 above opening 5. Shutter plate 7 is normally held in the position shown in solid lines by a solenoid 9 mounted on a housing 10 which is only illustrated by dash-dotted lines to better show the shutter 7. Solenoid 9 is normally energized to hold the shutter plate 7 in the elevated position shown. An energizing circuit for the solenoid 9 comprises at least one sensor 11, which is normally a thermal sensor, but can also be a smoke monitoring sensor, which controls switching stage 12 normally connecting the solenoid 9 with a source of positive d.c. voltage. It shall be understood that the sensor arrangement controlling the switching stage 12 may also comprise at least one light-electric transducer monitoring the surface of the belt 4 in order to avoid that the shutter 7 is released just in a moment where the opening 5 is obstructed by an article conveyed by the belt.

In case the sensor 11 determines an elevated temperature, or some smoke, the signal of the sensor 11 causes the switching stage 12 to deenergize the solenoid 9 so that the shutter plate 7 falls under its own weight into a position 7' shown in dash-dotted lines. In this position the shutter plate 7 may prop upon the belt of the conveyor 4, while lateral gaps are closed by protective side walls 10' of the housing 10. Any small gap that possibly will remain can be filled out by a known foaming material which foams under the influence of the heat of the fire, such as a material sold under the brand name PROMASEAL PL.

Alternatively, the shutter 7 can be dimensioned in such a way that it covers the opening 5 completely when in closed position, i.e. so that it lies substantially within the plane of the fire barrier wall 1 when being closed.

It is to be understood that the arrangement of this release mechanism 9, 11, 12 is merely exemplary and may be replaced by any other mechanism known to those skilled in the art. However, it will be appreciated that this kind of "drive" which relies only upon the own weight of the shutter plate is extremely simple, and needs only a release mechanism, while guiding is performed by the hinge 8 so that a complex guiding structure is not necessary. Moreover, it can be seen that in case of an inclined conveyor 4, the path of movement of the shutter plate 7 is very short and reaches only over an angle $\alpha$ so that closing of the opening 5 is effected very rapidly.

Figure 2:
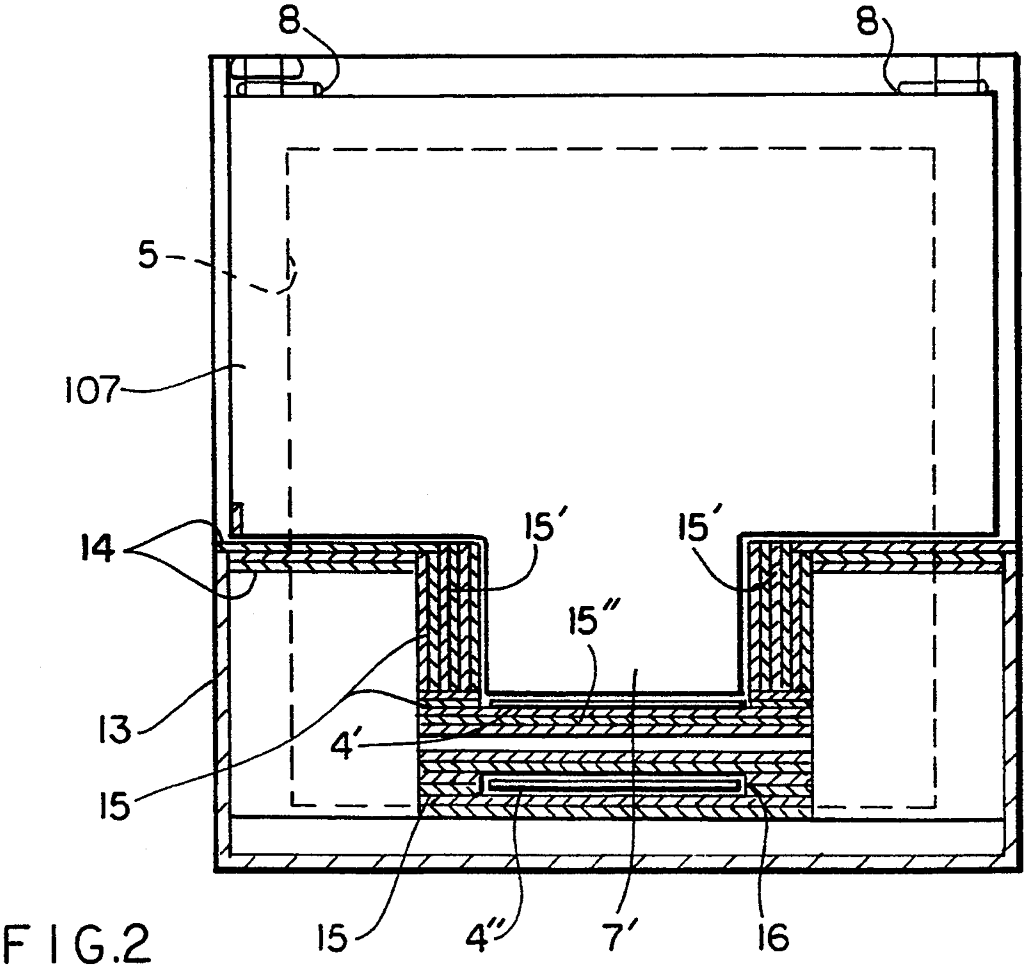
FIGS. 2 and 3 show another embodiment with a belt conveyor encased in closed position of a sliding shutter, FIG. 3 being a side view, partially in cross-section, along the line II—II of FIG. 2.

FIG. 2 shows another embodiment using a pivotal shutter. As in most of the further Figures, the mere fire barrier wall has been omitted. Parts of the same function as in previous Figures have the same reference numerals, parts of only a similar function have the same reference numeral, but with a hundred added.

Figure 3:
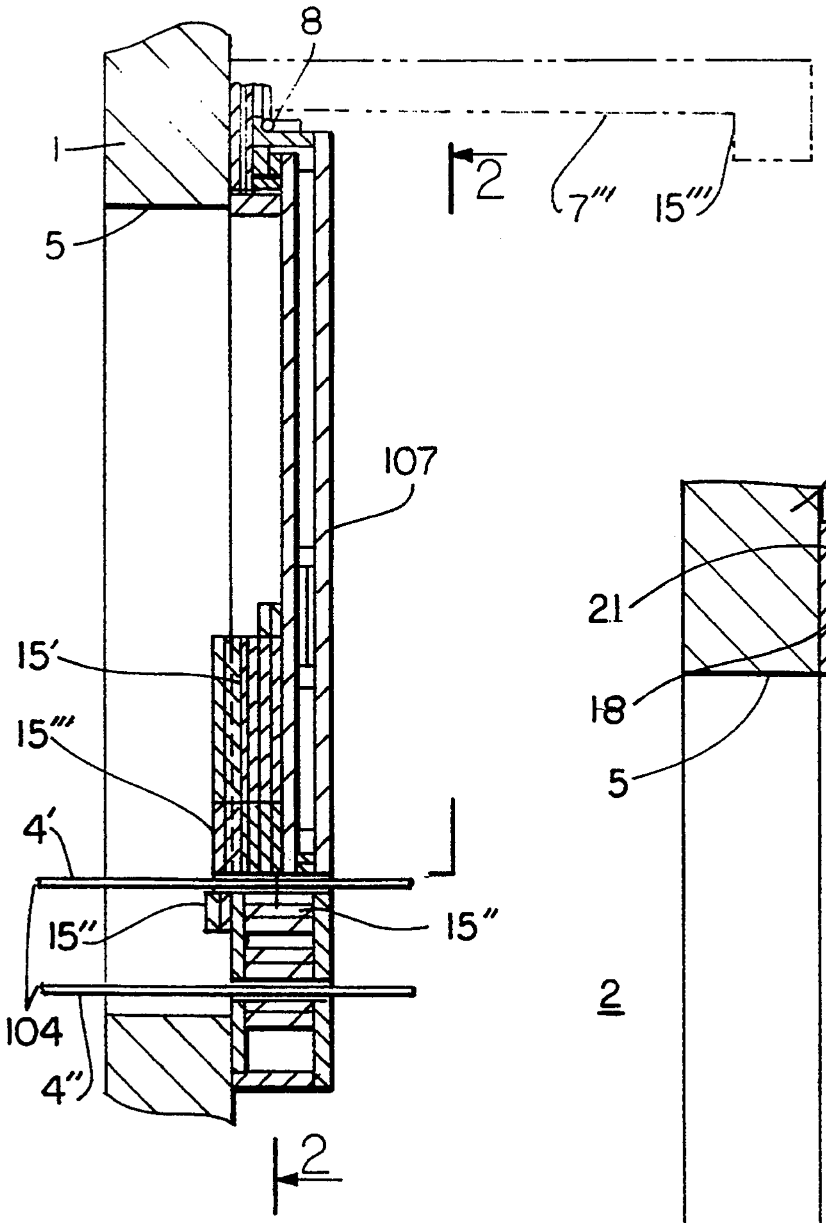

According to FIGS. 2 and 3, there is a belt conveyor 104 (FIG. 3) which extends substantially in horizontal direction through the opening 5 of the fire barrier wall 1. Belt conveyor 104 comprises an upper or load bearing section 4' for carrying a load on its top surface, and a lower or idle section 4". Thus, it is possible to encase the idle section 4" even under operating conditions, while providing a free cross-section of the opening 5 above the load bearing section 4' for enabling transfer of articles on it.

As best seen in FIG. 2, there is a frame 13 surrounding a casing 14, e.g. of sheet metal, wherein a packing of laminated foaming material 15 is located. This material will foam when exposed to heat in order to seal any gap. It is clear that the casing can be formed solely by the foaming material and the sheet metal can be omitted, if the foaming material is of sufficient strength. The foaming material 15 forms a slot-like opening 16 in order to enable passage of the idle section 4" of the belt conveyor. Thus, this idle section is totally encased by this material 15 and any gap in between will be sealed in case the heat of a fire causes the package material 15 to foam.

As will be recognised from FIG. 2, two parallel upright packages 15' of the laminated material 15 form a trough which encases the latteral edge surfaces of the load bearing section 4' of the belt conveyor 104, while its lowermost surface is encased by a horizontally extending package 15". Thus, only the top surface of the load bearing section 4' has to be protected by the pivoting shutter 107. The foaming action of the horizontal package 15" has to be chosen in such a manner that section 4' is pressed in upward direction against the lowermost edge of shutter 107. Alternatively, this edge of the shutter 107 may also be provided with a strip of foaming material, as is indicated at 15''' in FIG. 3. There, the open position of shutter 107 is shown in dotted lines at 7'''. The shutter may be held in open position by a solenoid, such as 9 in FIG. 1, or by any suitable means.

In contrast to the arrangement of FIG. 1, the shutter 107 is dimensioned in such a way that it lays in a plane parallel to the fire barrier wall 1 when in its closed position (FIG. 3). The shutter 107 has a tongue 7' which protrudes from its main body into the trough formed by the upright laminae 15' and the horizontal package 15". As is apparent from FIG. 2, only very small gaps remain between the shutter 107 and its tongue 7', and the laminated foaming material 15 which gaps can rapidly and easily be sealed in case of a fire.

Figure 5:
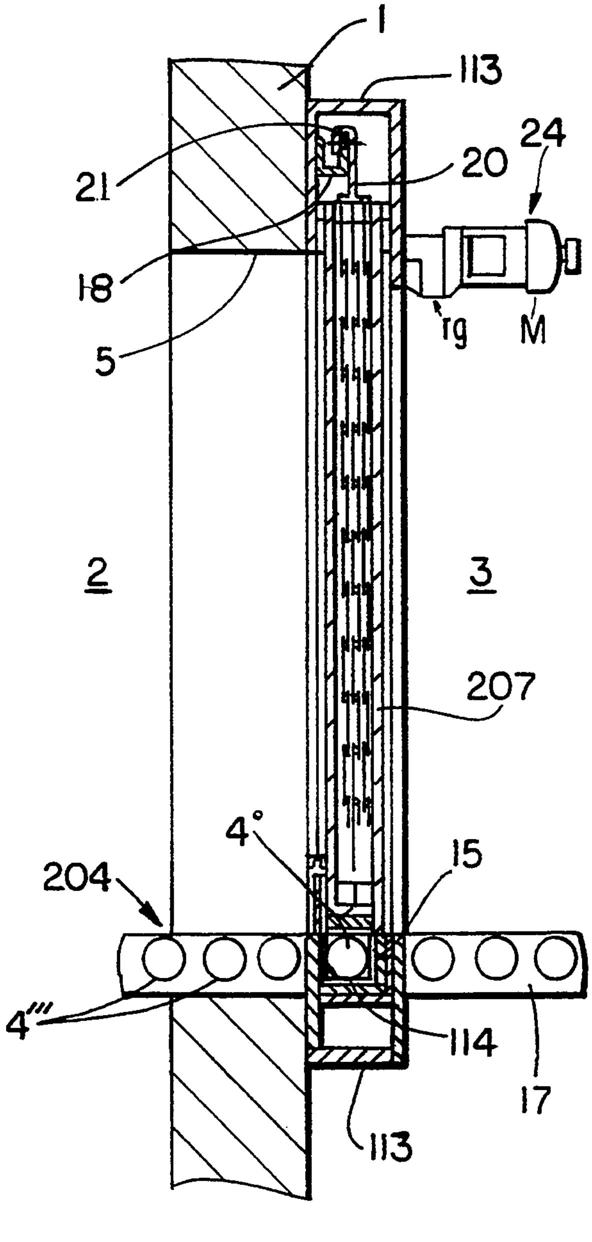
FIGS. 4 and 5 illustrate an embodiment with a roller conveyor where a conveyor member is encased when closing the shutter.
Figure 4:
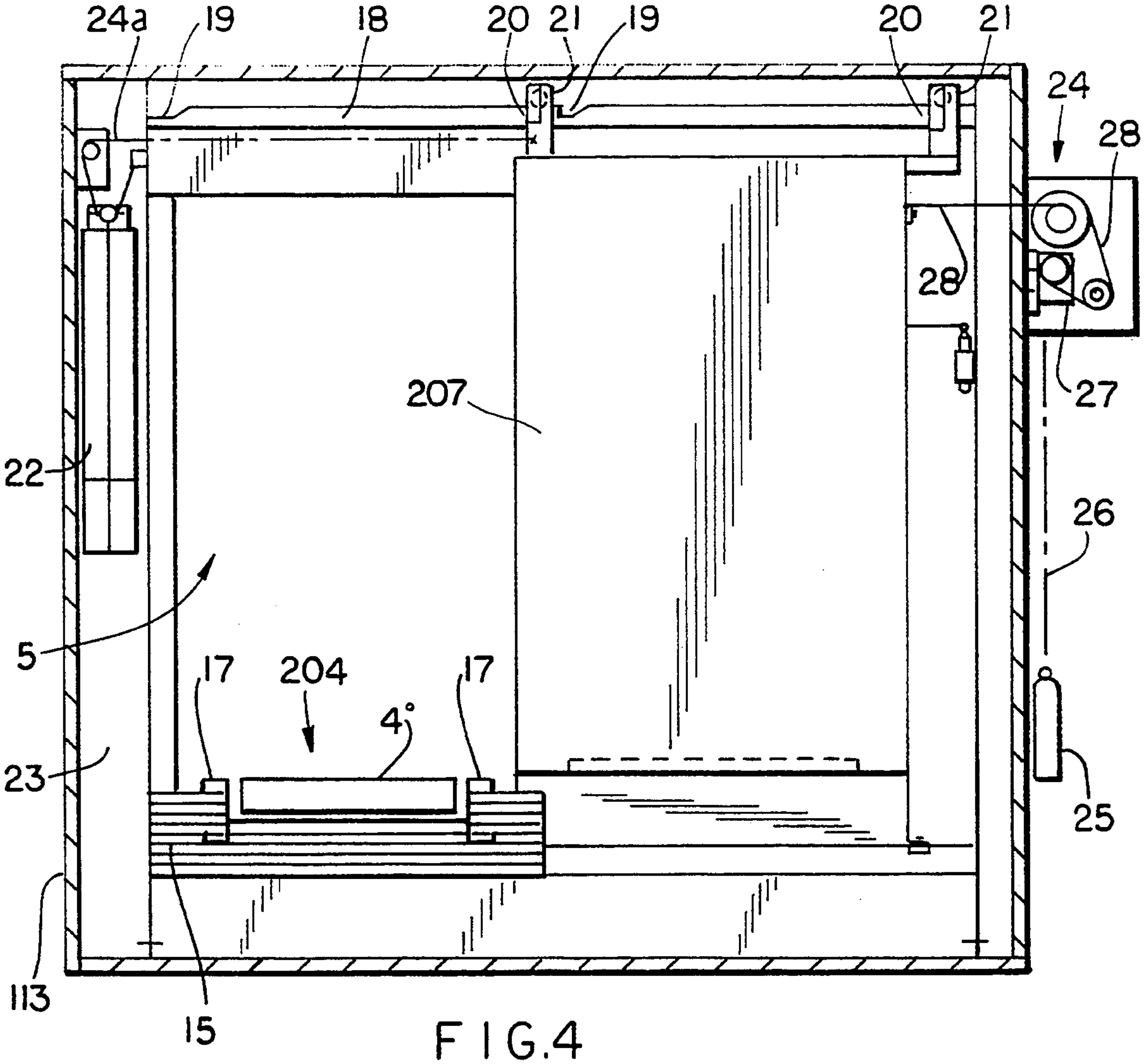

It is clear that a relatively flat conveyor element, such as a belt section 4' or 4" can easily be encased and sealed after the shutter is brought into its closed position. Of course, although a pivotal shutter is shown in FIGS. 2 and 3, it would be likewise possible to provide a sliding shutter, as will be described below. FIGS. 4 and 5 show how the concept of this invention, i.e. encasing of a conveyor element can be realized with a more bulky element, such as of a roller conveyor.

According to FIG. 5, a roller conveyor consists of a row of individual rollers 4''' which are journaled at both ends in rails 17. The rollers 4''' may be driven, e.g. by a chain and chain wheels (not shown), or may be turning freely in order to convey articles through the opening 5. Between the portion of the conveyor 204 extending in room 2 and that portion which extends in room 3, there is an intermediate roller 4· just in the plane of a sliding shutter 207.

In order to avoid that the roller 4· may interfere with the shutter, when closing the same, thus leaving a larger gap, the roller 4· is encased by a generally U-shaped stationary casing 114 so that only its top surface portion is left free for enabling transport of the articles. In case of a fire, however, the shutter 207 is moved from its right position shown in FIG. 4 to the left, thereby closing the opening 5. The lower edge surface of the shutter 207 has a complementary downwards facing U-shape (cf. FIG. 5) so as to close the stationary casing 114 in closed position of the shutter 207. While the stationary casing 114 may be lined by a foaming material, the complementary U-shaped lowermost edge of the shutter may be totally formed by laminae of such a material so that any gap will be sealed if the material 15 is exposed to heat.

Also in this case, there is a frame 113 surrounding the opening, as best seen in FIG. 4. A rail 18 is mounted within the upper portion of the frame 113 for guiding sliding movement of the shutter 207. Two cut-outs 19 ensure that the shutter is easily maintained either in its open position or in closed position. To this end, the shutter 207 comprises holding straps 20 which support rollers 21 riding onto and rolling along the rail 18. The cut-outs 19 ensure also that the shutter 207, after having reached its closed position, drops into those cut-outs or recesses, thereby lowering in such a way that any gap, which may be useful for ensuring undisturbed sliding motion of the shutter into its closed position, along its lowermost edge is diminished so that the casing 114 is well closed.

For moving the sliding shutter 207, there may be a simple weight 22 in a lateral space 23 of the frame 113. The weight is connected to the shutter 207 by way of a cable 24a shown in dash-dotted lines in FIG. 4 and connected to the foremost holding strap 20. Thus, even if a fire affects the electrical network, closing of the opening 5 is ensured, since no current is needed for driving the shutter 207. It is to be understood that the invention is not restricted to a drive by weight 22. Especially, where there are redundant systems with an emergency power supply or with releasable fluid systems, it would be likewise possible to use any known driving arrangements such as electric or fluidic motors and driving systems.

If the weight would simply act onto the shutter without any counter-measure, movement of the shutter would become faster and faster with the risk of bumping against the left-side portion of the frame and thereby possibly causing damages and calling in question its function. Thus, although a simple weight 22 might be sufficient with smaller shutters, it is beneficial to have a damping or braking arrangement 24 which may be of any kind known in the art, such as a fluid damping arrangement, but is here simply formed by a counterweight 25 hanging on a cable 26 which will be wound up onto a roll 27 from which another cable 28 is unwound when the shutter 207 moves into its closed position.

As may be seen from FIG. 4, the damping or braking arrangement 24 may comprise a motor M in order to return the shutter 207 from its closed position to its open position. The motor M will ordinarily be connected to a reducing gear rg which may also include a freewheel clutch that enables free running of the shutter 207 into its closed position under the action of the weight 22, while coupling the motor M with the roll 27 (FIG. 4) when rotated to move the shutter 207 into its open position. Alternatively, there is no clutch, and the motor M is of the slow speed-type having a rotor with permanent magnets and stator coils so that it acts as a generator when not exited. In this way the motor M acts as an electric brake during closing movement of the shutter 207 in order to ensure controlled speed of it, whereas it takes over its usual roll as a motor when energized to move the shutter 207 into its open position shown in FIG. 4. Thereby, the reducing gear rg may either be omitted or greatly simplified.

In order to fill all gaps that might be present between the shutter 207 and the conveyor 204, a package of laminated foaming material 15 may be provided within the plane of the shutter and below the conveyor 204, as is best seen from FIG. 4.

In the above embodiments, a stationary casing 14 or 144 has been used to encase a conveyor element which just lies within the plane of the shutter closing the casing when in its closed position. In more conveyors of more complex shape, however, it is convenient to have only movable parts to encase the respective conveyor element within such plane.

Figure 6:
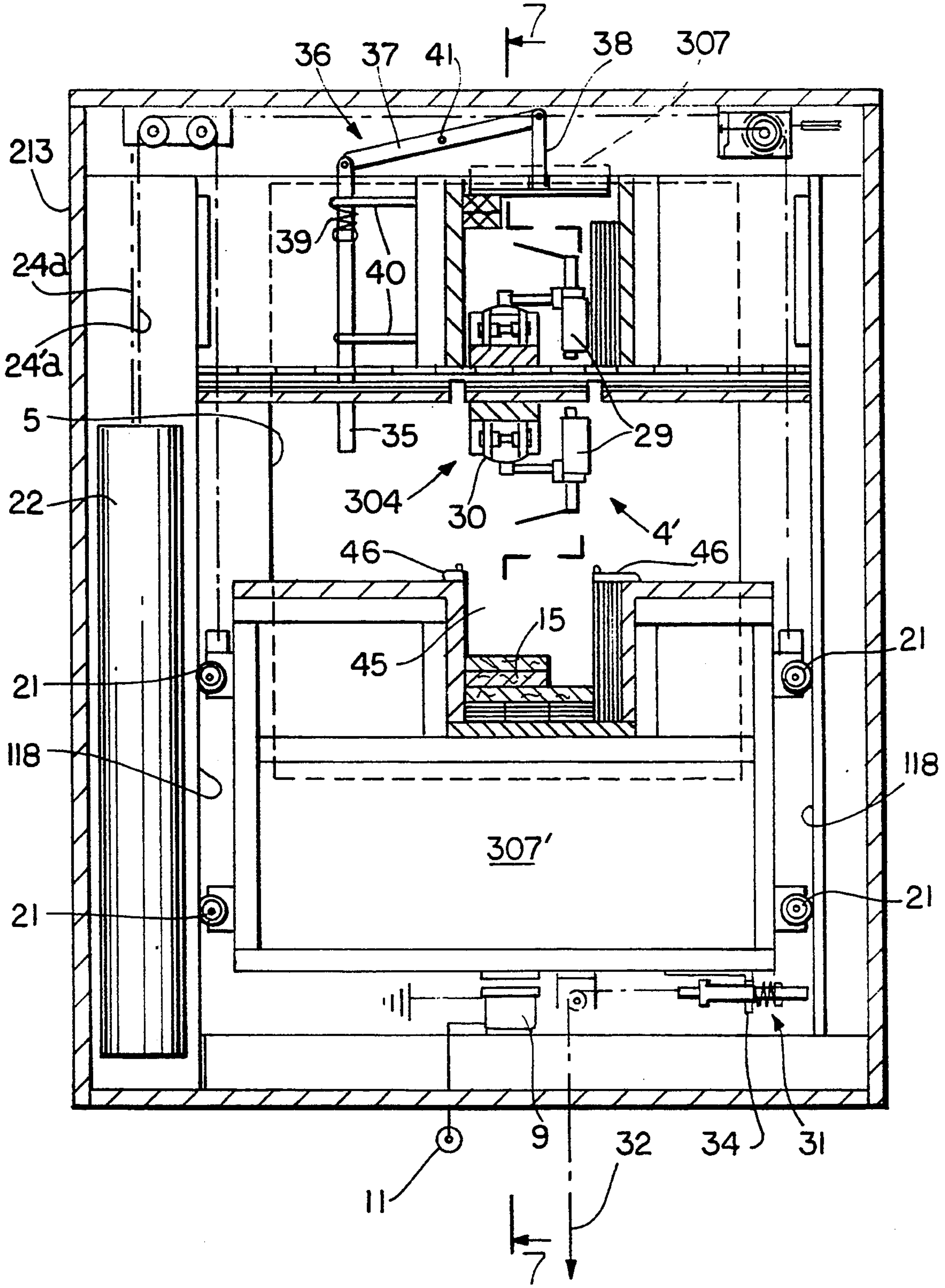
FIGS. 6 and 7 represent the case of a hanger conveyor as used for transporting individual sheet-like material, such as newspapers, together with an alternative encasing arrangement, FIG. 6 being a side view and FIG. 7 a cross-sectional view along the line VII—VII of FIG. 6.
Figure 7:
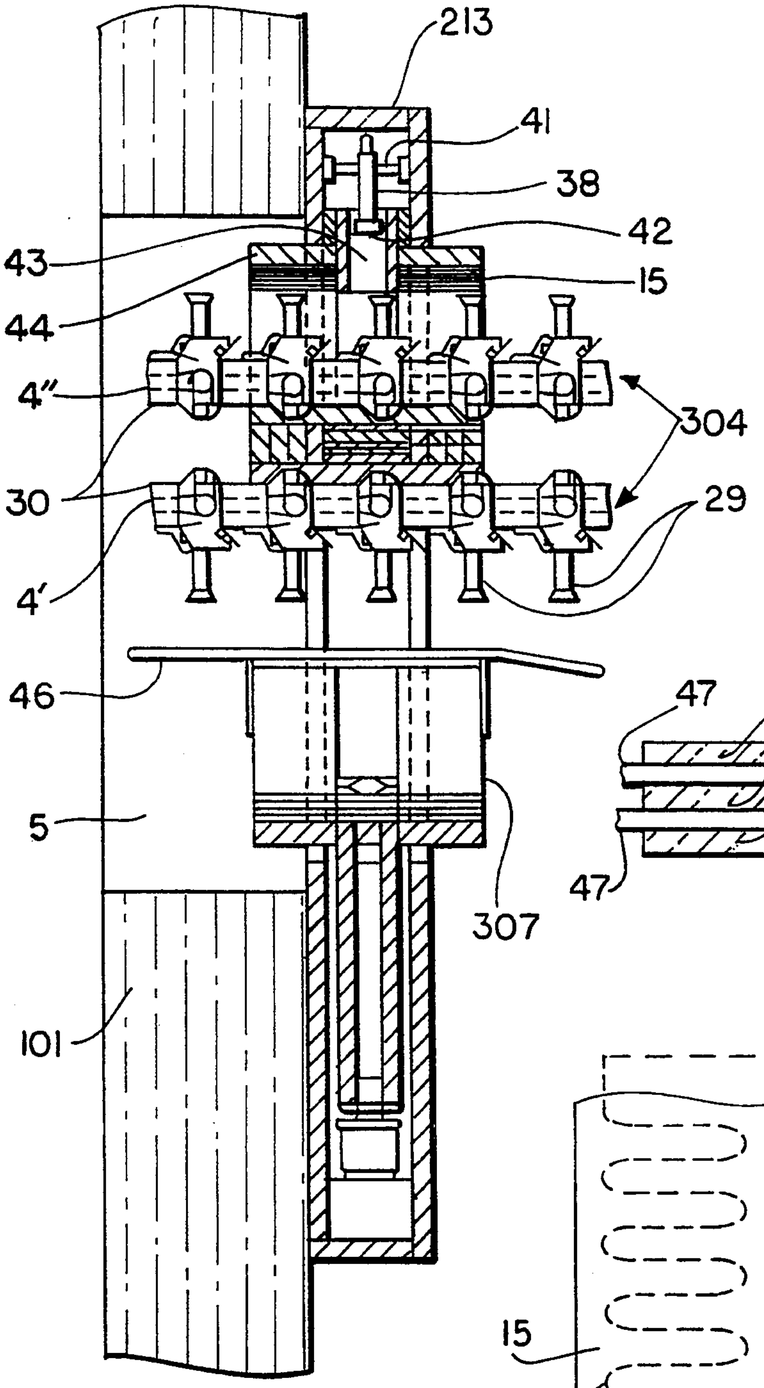

Such an embodiment is shown in FIGS. 6 and 7 where a suspension or overhead conveyor 304 is shown. This conveyor 304 has a downwards directed load bearing section 4' and an upper idle section 4'' and comprises individual hangers or clampets 29 which project upwards and downwards from an endless drawing means 30, such as a chain. Therefore, although the idle section does not need any free space for an article to be transported, there must be space enough for the hangers or clampers 29 so that a stationary casing for the idle section would, in most cases, be improper. This is also due to the fact that one has to consider in some cases the possibility of a failure in operation of the hangers or clampers 29, e.g. when conveying individual newspapers, so that one of the articles is not released by a clamper 29 and is conveyed back by the idle section 4''. In such a case, the article would cause jamming, if the idle section were stationarily encased.

Therefore, according to FIGS. 6 and 7, there are provided at least two shutter elements 307, 307' for closing the opening of a fire barrier 101 which may consist of a plurality of layers of fire resistant material. These shutter elements 307, 307' are slidably guided to move in opposite directions. To this end, a similar driving arrangement is used as in FIG. 4 using a weight 22 connected to both sides of shutter 307' via cables 24a, 24'a. The shutter element 307' is also provided with guide rollers 21 running on lateral guide rails 118. Normally, the shutter element 307' is held in open position by the solenoid 9 (FIG. 6) which is controlled by at least one sensor 11 in a similar way as in FIG. 1. The shutter element 307' may optionally be locked (e.g. in case of a repair or when current to solenoid 9 has to be switched off) by a locking device 31 hedl in unlocked position by a weight 32, but can be inserted into a hole of a tab 34 mounted on the bottom edge of shutter element 307'.

Drive of the upper shutter element 307 is effected by the lower shutter element 307'. To this end, a sensing rod 35 is provided which senses the position of the lower shutter 307'. It is clear that any other sensor could be provided instead, but that a mere mechanical sensor is more reliable, since there is always a risk that the current network could be affected in case of a fire. The sensing rod 35, which extends in the direction of movement of the shutter element 307' to form an upwards actuated push rod, is connected to a movement reversal arrangement 36 which consists substantially of a double-armed lever 37 pivotally mounted about an axle 41, said lever engaging on one end the sensing rod 35 while actuating on its other end a push rod 38 connected to shutter element 307.

In order to keep the upper shutter element 307 normally in open position, the sensing rod 35 is biased by a pressure spring 39 in downward direction. Rod 35 passes through respective guide holes of lateral projections 40. The lower end of the push rod 38 is connected to a substantially horizontal bar 42, as best seen in FIG. 7. The bar 42 extends within a casing 43 just wide enough in cross-section as to embrace one of the holders or clampers 29 when situated exactly below. As is seen from FIG. 6, the moveable casing runs within the hollow frame 213 which closes the top of the casing 43. A horizontal plate 44 mounted on the casing 43 supports laminae of foaming material 15 which is suitably arranged in such a manner as not to interfere with the neighboring holders 29 which, according to FIG. 6, are offset with respect to a center plane running through the chain 30 of the conveyor 304. In this way, the upper shutter element 307 can be virtually lowered down to the chain 30. Simultaneously, the lower shutter element 307' will embrace the load bearing section 4' of the conveyor 304 by a rectangular recess 45 lined with foaming material 15. Two rails 46 may serve to tighten any gap between the lower shutter element 307' and to distribute its pressure over a larger area.

Since the casing 43 is relatively narrow as compared with the width of the holders 29, it will be convenient to provide an appropriate control for ensuring that the shutter element 307 can only be lowered when a holder 29 is situated exactly beneath its cavity. Such a control can be effected in various ways known per se to those skilled in the art. For example, a a light barrier might be provided within the opening 5 to sense the presence of a holder 29 in a position which corresponds to another holder being situated exactly beneath the casing 43. By way of such a light barrier conveyor 304 is only switched off when the light barrier is interrupted. Of course also other sensors may be use, such as inductive coils influenced by the metal of the holders. The same applies if capacitive sensors are used.

Another possibility for such a control is to move the chain 30 intermittently in such a way that when the chain stands still, a holder 29 is situated beneath the casing 43. A locking device may also be foreseen which releases the shutter element 307 only if the chain is not moving. A further approach for such a control can consist in providing a slow motion drive which becomes active when the main drive for the chain 30 is interrupted due to a fire sensed by the fire sensor 11 (vide FIG. 1, here not shown). Controlled by a sensor, such as described above, the slow motion drive would move the chain 30 until a holder 29 is located directly below the casing 43.

It will be apparent that the importance of the foaming material with conveyors of rather complicated shape is still greater and that, in case, more foaming material has to be used in comparison with simple conveyor shapes, as in the previous Figures. Since, however, the foaming material 15 is a poor heat conductor, there is the danger that it will foam only locally where it is exposed to highest temperatures. In order to get a uniform foaming effect, it is advantageous to enhance heat conductivity of those packages.

Figure 8:
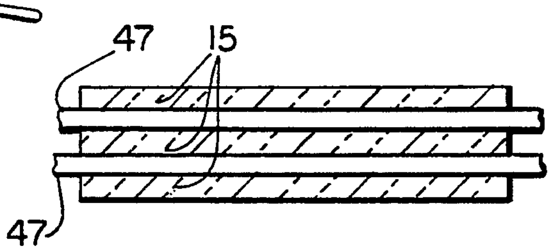
FIG. 8 is an enlarged view of a preferred detail of FIG. 7.

FIG. 8 illustrates on a larger scale how this can be done. According to the invention, bodies 47 of heat conductive material, such as metal, e.g. aluminium, are inserted into the package of foaming material 15. Such heat conductive bodies serve for distributing heat in a uniform manner over the volume of the foaming material 15. Therefore, these bodies, in principle, may assume any suitable form, such as the form of particles, granules or the like. It is preferred to provide elongated bodies 47 which transfer heat over their length without interruption. Such elongate bodies may be sheet-like or rod-like. It is advantageous, if the elongated bodies 47 reach to at least one of the edges of the foaming material 15 to take up heat from there. Preferrably, the elongated bodies 47 project beyond the margins of the foaming material 15 so as to expose a larger area to heat. Furthermore, the outer surface of the bodies 47, at least at their projecting ends, is suitably of an obscure color, particularly black, in order to better take up heat radiation.

Figure 9:
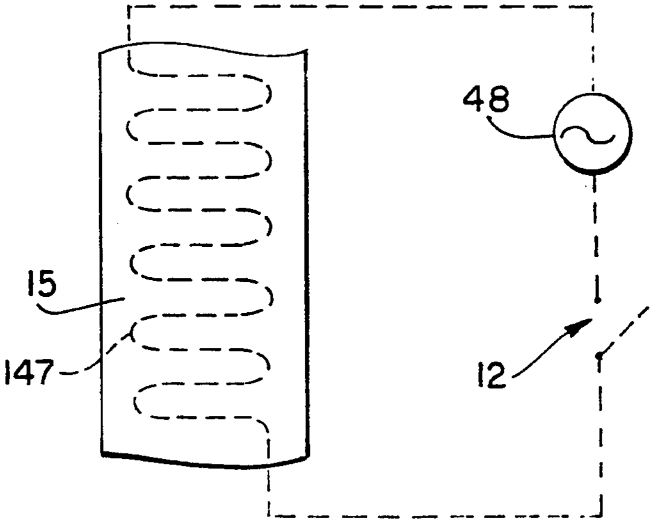
FIG. 9 a top view of FIG. 8, but in an alternative embodiment.

Heat transfer can also be provided, according to FIG. 9, by incorporating a resistance wire 147 into the foaming material 15. This resistance wire may be connected to a source 48 of alternating current via the switching stage 12 (vide FIG. 1) controlled by at least one fire sensor (not shown). Alternatively, in order to avoid a current connection, the bodies 47 or the wire 147 may be made of a material which is incendible by heat, e.g. in the manner of the so-called sparklers, or providing exothermic effects in another chemical way, e.g. catalytically, It is clear that numerous modifications can be realized, e.g. by incorporating heat conductive particles and elongated bodies as well. Likewise, some of the bodies may be be connected to a source of current, while others are not. Moreover, it would also be possible to induce heat within the bodies 47 by inductive means controlled by the switching stage 12.

Figure 10:
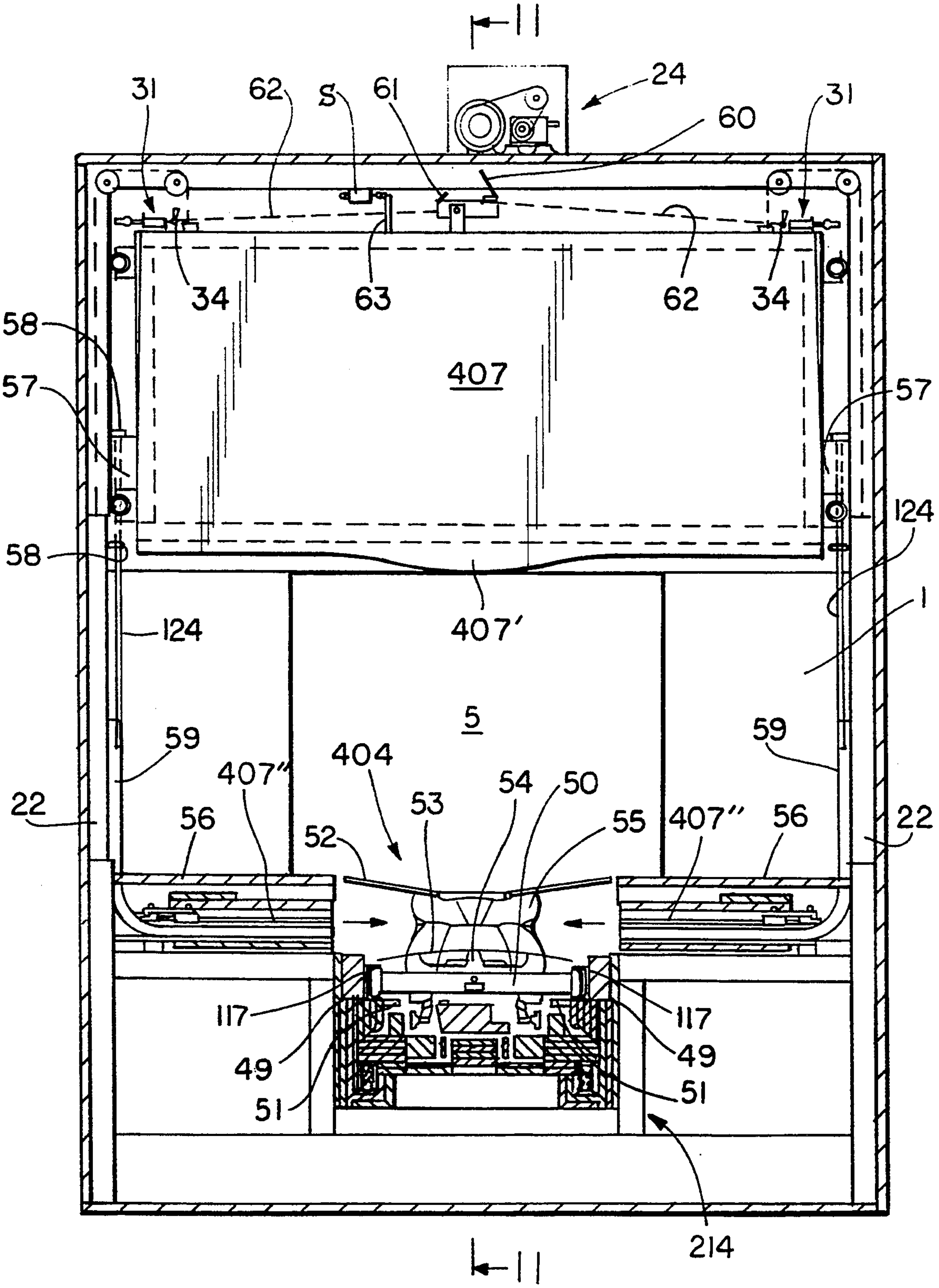
FIGS. 10 and 11 depict an encasing arrangement for a tipping bucket conveyor, FIG. 11 being a cross-sectional view along the line XI—XI of FIG. 10.
Figure 11:
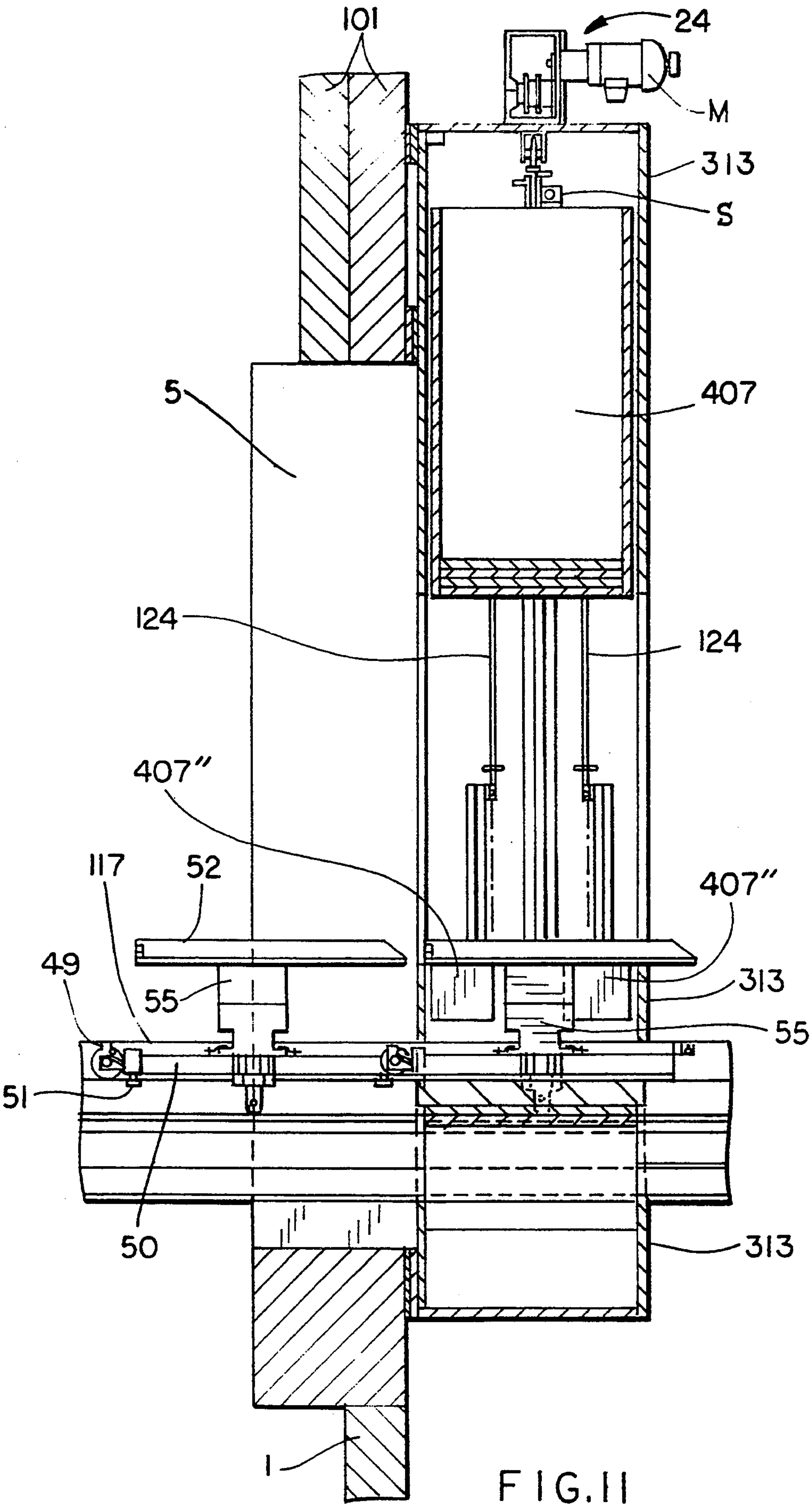

In FIGS. 10 and 11, a type of conveyor, i.e. a tipping dish conveyor, is shown, the cross-sectional shape of which is still more complicated. Such conveyors are employed, for example, for sorting piece goods, such as parcels.

The conveyor 404 comprises a pair of opposedly situated guide rails 117 of a cross-section similar to a question mark. The U-shaped upper portion of them serves as a run way for a first pair of rollers 49 on a carriage 50, while the lower substantially vertical portion guides a second pair of rollers 51. As is seen from FIG. 11, there is a row of mutually interconnected carriages 50 of identical design. Each carriage 50 supports a dish 52 which is tiltable against the force of a double-acting leaf spring 53 about a tipping axis 54. Each dish 52 is held on a support 55 which tilts together with the dish 52 if the latter is caused to a tipping movement by means not shown, but known per se.

Thus, it is clear that, while the dish 52 has to be of a relatively outtrigging shape, the support 55 has only a restricted width. Although the lower portion of the conveyor 404 including the carriages 50 and the rails 117 is encased by a stationary casing 214 whose top surfaces are formed by plates 56 substantially extending in the upper plane of the dishes 52, and the shutter 407 has a tongue 407' of complementary shape to the indentation of the dishes 52 shwon in FIG. 10, some openings would remain even with the shutter 407 in closed position at both sides of the support 55.

In order to encase also the support 55 and to close the openings at its sides, there are two pairs of substantially prismatic shutter elements 407'', each pair on either side of the conveyor 404 with respect to center plane extending along it, which are slidably guided within the frame 313, one pair being shown in a front view in FIG. 11. The shutter elements 407'' are actuated each by a cable 124 connected with one end to the shutter elements 407'', while the upper end is connected to ears 57 of the shutter 407 where they are inserted into a respective vertical hole. Two adjustable stop rings 58 attached on each cable 124 above and below each ear 57 serve to adjust the movement and the end position of the shutter elements 407''.

Each cable 124 is guided in the manner of a Bowden wire within a jacket 59 wherein a compression spring (not shown) is inserted between two pieces of cable 124 within the jacket 59 in order to enable a resilient abutment of the front surface of one of the shutter elements 407" against the support 55, if the support 55 is not just in a centered position with respect to the cross-section of the frame 313. Such a situation is shown in FIG. 11 where the left-hand shutter element 407" is freely movable to close the space behind the support 55, while the right-hand shutter element 407" (under the action of the pressure spring mentioned above) props against the support 55 and cannnot reach its fully closed position. In this way it is ensured that at least one of the shutter elements 407" will be able to close the openings at each side of the of the conveyor 404 (when seen in cross-section through it, as in FIG. 10). Such closing action, in pronciple could also be attained by a proper amount of foaming material (especially in embodying the heat transfer elements 47 or 147) at this location, but this could affect the function of the tipping dishes, on the one hand, and could be difficult to be realised in a reliable manner.

For elevating the shutter 407 from its closed position into its open position, there is again the unit 24 with the Motor M. In the present embodiment, however, the roll 27 of this braking unit 24 is frictionally connected to a drawing member 60 engaging one end of a two-armed lever 61. Each end of the lever 61 is also connected to locking devices 31 to lock the shutter 407 just in the moment when it reaches its uppermost position. Connection is made by two cables 62. This is done by the motor M which frictionally draws on the drawing member 60 when rotating so that the lever 61 is pivoted with respect to the position shown in FIG. 10 in counterclockwise sense, thereby pulling the cables 62 so as to draw the locking devices against their locking position within a hole of tabs 34. Concurrently with reaching its uppermost position, the shutter 407 actuates a limiter switch S for interrupting the current to motor M. In this way, overshooting of the upwards movement of the shutter 407 is prevented both by the locking devices 31 and the switch S. When rotation of the motor M stops, the lever 61 either returns into the position shown, e.g. by springs (not shown) acting onto the locking devices 31 so that the shutter is again free to move downwards in case of a fire and is held, for example, by magnetic means as in FIG. 1. Alternatively, the drawing member 60 is a cable connected to the shutter 407, instead of being fastened to the lever 61, and the shutter 407 is moved by the motor M both up and down, the weights 22 (FIG. 10) serving only to determine the pressure of the shutter 407 onto the respective dish below it when the motor M is switched off.

Figure 12:
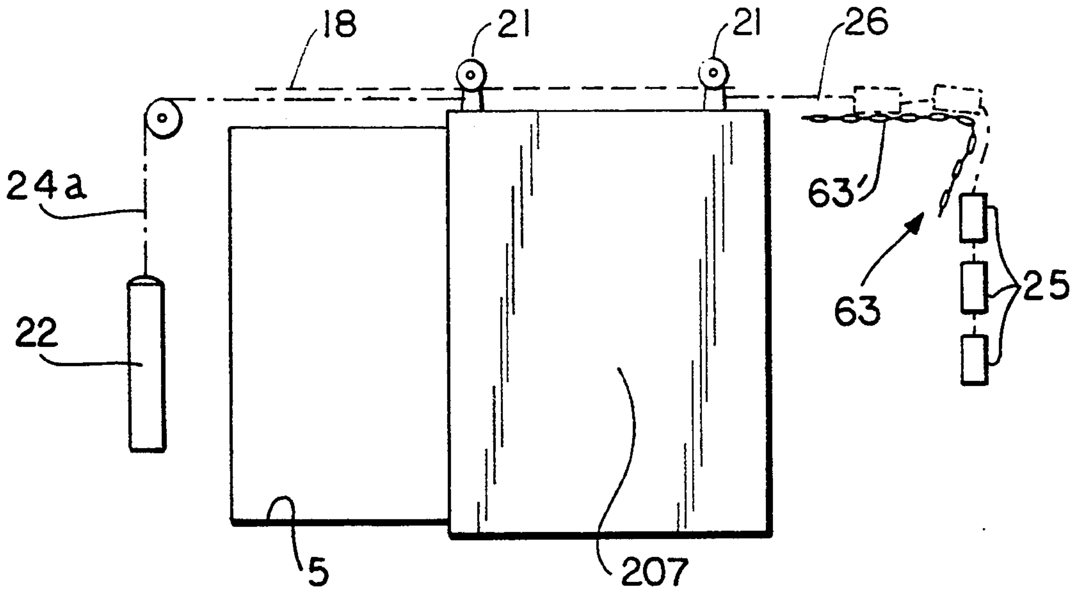
FIG. 12 shows a particular driving arrangement for a sliding shutter, especially suited for endless conveyors, particularly belt conveyors.

In some cases, it may be important to predetermine the pressure with which the shutter acts onto a respective counter member, especially if the shutter presses against a conveyor element, as in FIGS. 2 or 10. FIG. 12 illustrates how a programmed speed and pressure of the shutter can be obtained, even if the shutter is merely driven by weight 22. As an example, a similar embodiment is chosen as in FIG. 4, but will be understood that the principles of such a programmed motion can be also applied to other emodiments, as also in other cases individual features of one embodiment could be applied to another embodiment within the scope of the invention.

In FIG. 12, the counter-weights 25 are subdivided into a plurality (or at least two) weights 25 arranged in spaced relationship along the cable 26. When the shutter is in open position, the weight of all weight elements 25 will counter-act against the weight of body 22 so that the shutter 207 will begin to move with a relatively slow motion. When the shutter 207, however, comes close to its closed position, the weight elements 25 reach a guide 63, the surface of which might be formed by bearing needles or rollers in order to minimize friction. The guide 63 comprises at least one substantially horizontally extending portion 63' where the elements 25 come to lay successively when the shutter almost reaches its end or closed position. In this way the counter-weight is successively diminished so that the shutter 207 is pressed with the full weight of the weight body 22 towards its closed position, thus ensuring tight closure of the opening 5.

It is to be understood that the arrangement of a plurality of weight elements and a respective guide with a horizontal porion can also be realised with the weight 22 or both the weight 22 and the counter-weight 25. In some cases, it may, to the contrary, be desirable to relieve the pressure in the closed position and to start movement of the shutter with relatively high velocity. For such cases, it will be apparent that the guide 63 can be formed in accordance with the program desired so as to obtain the necessary speed and pressure of the shutter.

What is claimed is:

1. A fire barrier apparatus comprising:

wall means separating two adjacent spaces, extending in a predetermined plane and being formed by a fire resistant material, said wall having an opening;

conveyor means defining a conveyor path which extends through said opening, said conveyor means including at least one conveyor element within said predetermined plane;

shutter means within the range of said opening, being of fire resistant material and being movable towards said conveyor element and away between an open position to give said opening free, and a closed position wherein said opening is shut off, at least part of said shutter means being comprised in an encasing arrangement for encasing said conveyor element in said closed position of said shutter means, wherein said encasing arrangement comprise stationary encasing means surrounding said conveyor element in part, the remaining part being encased by at least part of said shutter means, and wherein said shutter means comprise a lateral surface facing said conveyor element at least in said closed position, said lateral surface being hollow and complementary to said stationary encasing means to surround said conveyor element in said closed position.

2. A fire barrier apparatus comprising:

wall means separating two adjacent spaces, extending in a predetermined plane and being formed by a fire resistant material, said wall having an opening;

conveyor means defining a conveyor path which extends through said opening, said conveyor means including at least one conveyor element within said predetermined plane;

shutter means within the range of said opening, being of fire resistant material and being movable towards said conveyor element and away between an open position to give said opening free, and a closed position wherein said opening is shut off, at least part of said shutter means being comprised in an encasing arrangement for encasing said conveyor element in said closed position of said shutter means and wherein said conveyor element is a rotating element and said encasing arrangement comprise a cavity to encase said conveyor element within said cavity at least in said closed position of said shutter means.

* * * * *